US005536292A

United States Patent [19]

Holcombe et al.

[11] Patent Number: 5,536,292

[45] Date of Patent: Jul. 16, 1996

[54] METHOD OF PREPARING THERMAL INSULATION FOR HIGH TEMPERATURE MICROWAVE SINTERING OPERATIONS

[75] Inventors: Cressie E. Holcombe, Knoxville; Norman L. Dykes, Oak Ridge; Marvin S. Morrow, Kingston, all of Tenn.

[73] Assignee: Martin Marietta Energy Systems, Inc., Oak Ridge, Tenn.

[21] Appl. No.: 518,067

[22] Filed: Aug. 22, 1995

Related U.S. Application Data

[62] Division of Ser. No. 36,763, Mar. 25, 1993, Pat. No. 5,449,887.

[51] Int. Cl.$^6$ .................................................. C03C 23/00

[52] U.S. Cl. ................................ 65/23; 65/32.4; 65/33.1; 65/33.4; 65/60.1; 65/60.3; 65/60.7; 65/60.6; 252/62; 501/96; 501/99

[58] Field of Search ............................ 65/23, 33.1, 33.4, 65/32.4, 60.1, 60.3, 60.6, 60.7; 264/7, 29.1, 29.4, 29.6, 60; 252/62; 501/96, 99

[56] References Cited

U.S. PATENT DOCUMENTS

| | | | |
|---|---|---|---|
| 4,559,429 | 12/1985 | Holcombe | 219/10.55 F |
| 4,565,747 | 1/1986 | Nakae et al. | 264/81 |
| 4,743,340 | 5/1988 | Wrenn et al. | 162/152 |
| 4,770,930 | 9/1988 | Wrenn et al. | 428/285 |
| 4,810,846 | 3/1989 | Holcome et al. | 219/10.55 R |
| 4,880,578 | 11/1989 | Holcombe et al. | 264/26 |
| 4,963,709 | 10/1990 | Kimrey, Jr. | 219/686 |
| 5,072,087 | 12/1991 | Apte et al. | 219/759 |
| 5,154,779 | 10/1992 | Holcombe et al. | 219/10.55 R |
| 5,164,130 | 11/1992 | Holcombe et al. | 264/26 |
| 5,227,600 | 7/1993 | Blake et al. | 219/762 |

OTHER PUBLICATIONS

Cressie E. Holcombe, "New Microwave Coupler Material", American Ceramic Society Bulletin, vol. 62, No. 12, p. 1388 (Dec. 1983).

Dr. Rainer Duben, "Glassy Carbon—A Material For Use In Analytical Chemistry", Sigri Corporation, pp. 1–4.

"Calcined Petroleum Coke Flour and Particles", Great Lakes Carbon Corporation, Price List, pp. 1–2, Nov. 17, 1989.

"Vitreous Carbon", Atomergic Chemicals Co., pp. 1–5.

A. Greenville Whittaker and B. Tooper, "Single–Crystal Diffraction Pattersn From Vitreous Carbon," Jr. Am. Cer. Soc., vol. 57, No. 10, pp. 443–446 (Oct. 1974).

"Carbon (Carbon and Artifical Graphite)—Glassy Carbon", Encyclopedia of Chemical Technology, pp. 630.

*Primary Examiner*—Donald E. Czaja
*Assistant Examiner*—Sean Vincent
*Attorney, Agent, or Firm*—I. L. Ericson; J. D. Griffin; H. W. Adams

[57] ABSTRACT

Superior microwave transparent thermal insulations for high temperature microwave sintering operations were prepared. One embodiment of the thermal insulation comprises granules of boron nitride coated with a very thin layer of glassy carbon made by preparing a glassy carbon precursor and blending it with boron nitride powder to form a mixture. The blended mixture is granulated to form a grit which is dried and heated to form the granules of boron nitride coated with a glassy carbon. Alternatively, grains of glassy carbon are coated with boron nitride by blending a mixture of a slurry comprising boron nitride, boric acid binder, and methyl alcohol with glassy carbon grains to form a blended mixture. The blended mixture is dried to form grains of glassy carbon coated with boron nitride. In addition, a physical mixture of boron nitride powder and glassy carbon grains has also been shown to be an excellent thermal insulation material for microwave processing and sintering.

15 Claims, 1 Drawing Sheet

METHOD OF PREPARING THERMAL INSULATION FOR HIGH TEMPERATURE MICROWAVE SINTERING OPERATIONS

This invention was made with Government support under contract DE-AC05-84OR21400 awarded by the U.S. Department of Energy to Martin Marietta Energy Systems, Inc. and the Government has certain rights in this Invention.

This application is a division of application Ser. No. 08/036,763 filed Mar. 25, 1993, now U.S. Pat. No. 5,449, 887.

FIELD OF THE INVENTION

The present invention relates to a thermal insulation material and method thereof, more particularly, to a thermal insulation material for high temperature microwave sintering operations and method thereof.

BACKGROUND OF THE INVENTION

There has been a continual need for sintering nonoxide ceramics efficiently, particularly those that are suitable for high-hardness and high-temperature applications, such as are required for drill and tool bits and for ceramic armor. Boron carbide is an excellent lightweight material for ceramic armor and high-wear applications. However, the material does not sinter well, requiring temperatures of 2000° C. or higher for densification with or without hot-pressing. Microwave sintering has shown to be applicable for sintering the material, but the thermal insulating material cannot be yttria grit unless significant contamination by an yttrium-containing phase is acceptable.

OBJECTS OF THE INVENTION

Accordingly, it is an object of the present invention to provide a thermal insulation material for high temperature microwave sintering operations and method thereof.

Further and other objects of the present invention will become apparent from the description contained herein.

SUMMARY OF THE INVENTION

In accordance with one aspect of the present invention, a new and improved thermal insulation for high temperature microwave sintering operations comprises a material being an electrical and thermal insulator and being essentially a noncoupler with microwaves. The material comprises elements selected from the group consisting of boron, nitrogen, carbon, and combinations thereof.

In accordance with another aspect of the present invention, a new and improved method for preparing thermal insulation for high temperature microwave sintering operations comprises the following steps:

Step 1—Boron nitride granules are provided.

Step 2—A glassy carbon precursor is added to the boron nitride granules of Step 1 to form a mixture.

Step 3—The mixture of Step 2 is blended to form a blended mixture.

Step 4—The blended mixture of Step 3 is sieved to form a grit. The grit comprises a blended mixture of glassy carbon precursor and boron nitride granules.

Step 5—The grit of Step 4 is dried to form dried grit.

Step 6—The dried grit of Step 5 is heated at a temperature and for a period of time sufficient to carbonize the glassy carbon precursor contained in the dried grit to form a glassy carbon phase from the glassy carbon precursor to form a thermal insulation material for high temperature microwave sintering operations comprising granules of boron nitride coated with a layer of glassy carbon.

In accordance with another aspect of the present invention, a new and improved method for preparing thermal insulation for high temperature microwave sintering operations comprises the following steps:

Step 1—Glassy carbon grains are provided.

Step 2—A boron nitride slurry is prepared.

Step 3—The slurry of Step 2 is blended with the glassy carbon grains to form a blended mixture.

Step 4—The blended mixture of Step 3 partially dried to form a partially dried blended mixture.

Step 5—The partially dried blended mixture of Step 4 is sieved to form a grit. The grit comprises a blended mixture of glassy carbon grains coated with boron nitride.

Step 6—The grit of Step 5 is dried to form a dried grit to be used as thermal insulation material for high temperature microwave sintering operations comprising glassy carbon grains coated with boron nitride.

In accordance with another aspect of the present invention, a new and improved method for preparing thermal insulation for high temperature microwave sintering operations comprises the following steps:

Step 1—Glassy carbon grains are provided.

Step 2—Boron nitride powder is added to the glassy carbon grains of Step 1 to form a mixture.

Step 3—The mixture of Step 2 is blended to form thermal insulation for high temperature microwave sintering operations comprising a blended mixture of boron nitride powder and glassy carbon grains.

In accordance with another aspect of the present invention, a new and improved enclosure apparatus for high temperature microwave sintering of a ceramic article comprises a container made from a material essentially transparent to microwaves and thermal insulation contained in the container. The thermal insulation comprises a material being an electrical and thermal insulator and being essentially a noncoupler with microwaves. The material comprises elements selected from the group consisting of boron, nitrogen, carbon, and combinations thereof. The thermal insulation surrounds and intimately contacts a ceramic article inside the container.

Figure 1:
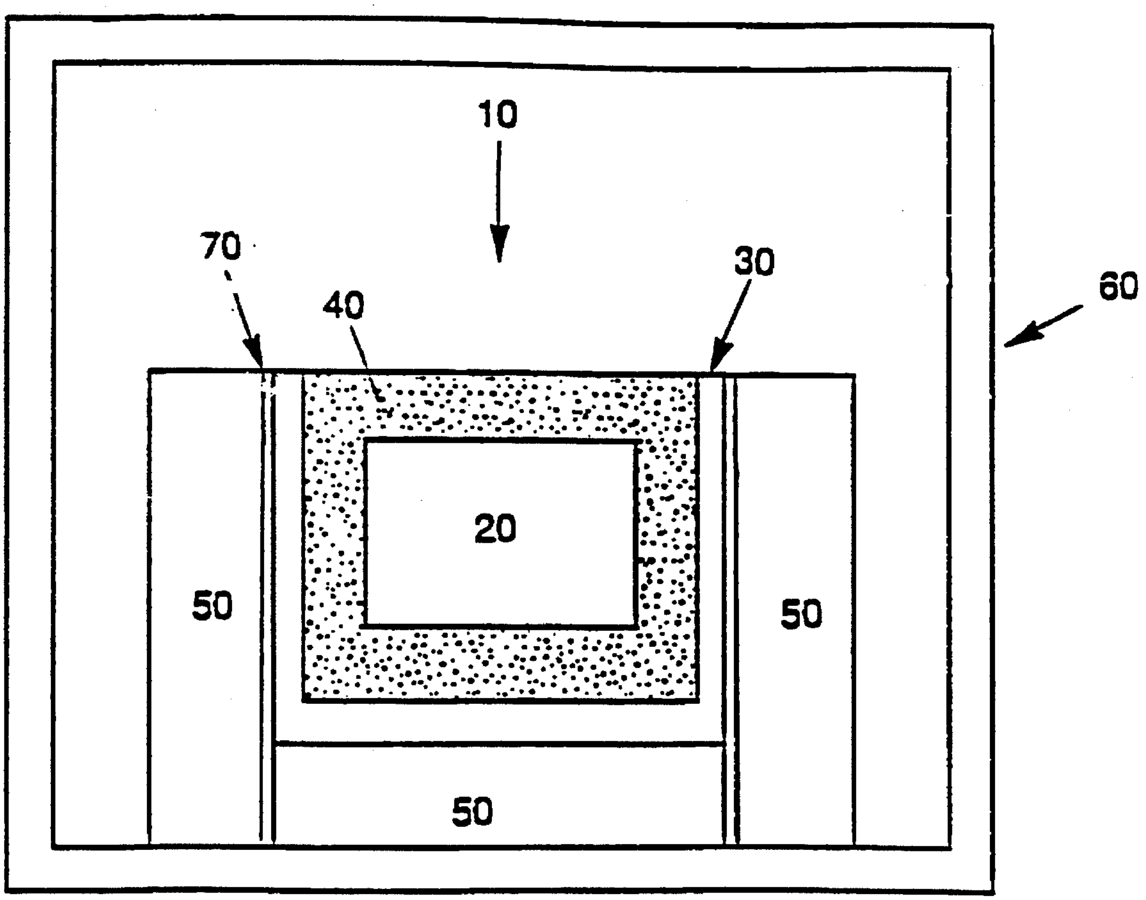
FIG. 1 is a cross-sectional view of a microwave furnace containing an enclosure apparatus for high temperature microwave sintering of a ceramic article in accordance with the present invention.

For a better understanding of the present invention, together with other and further objects, advantages and capabilities thereof, reference is made to the following disclosure and appended claims in connection with the above-described drawing.

DETAILED DESCRIPTION OF THE PREFERRED EMBODIMENTS

This invention allows boron carbide powder compacts to be microwave sintered without contaminating them with an yttria thermal insulation by using a new an improved thermal insulation for high temperature microwave sintering operations. One embodiment of this new an improved thermal insulation is a grit of boron nitride granules coated with a very thin layer of glassy carbon. The glassy-carbon-coated boron nitride granules are granulated to approximately the same size as standard yttria grit (i.e., −14, +100 Mesh size or 150 to 1400 microns size). The granulation is accomplished by blending boron nitride granules (typically 5 micron agglomerates of boron nitride powder having a particle size of about 0.1 to about 1 micron) in a glassy carbon precursor such as a slurry of furan resin in a polar solvent.

The following method of granulation was used:

A slurry of approximately 44.00 g. of furan resin in 1400 ml of acetone (polar solvent) was added to 550.00 g. of boron nitride granules having a granule size of about 5 microns to form a mixture. The boron nitride granules are agglomerates of boron nitride particles having a particle size of about 0.1 to about 1 micron. The mixture was spatulated in a dish forming a damp powder. The damp powder was hand-pressed through a 6 Mesh sieve to form a grit. The grit was allowed to air dry and then heated to 1000° C. in argon (vacuum could have been used) to carbonize the furan resin to a glassy carbon phase to form a thermal insulator grit. The estimated weight of the glassy carbon phase was about 25% to about 30% of the weight of the furan resin.

The resulting thermal insulator, a grit comprising granules of boron nitride coated with a glassy carbon phase, was used to fill a crucible-like container containing a boron carbide pellet to be microwave processed at 2.45 GHz. The thermal insulator surrounded the boron carbide pellet. During the microwave processing, the thermal insulator material did not arc, surprisingly, since the glassy carbon is an electrical conductor and since a thin layer of the glassy carbon is bonding the boron nitride particulates together. This thermal insulator allows the boron carbide pellet to absorb the microwave energy and uniformly heat up and does not contaminate the pellet. Many other packing materials have been tested, but none allow the heating of the boron carbide pellet or prevent contamination of the boron carbide pellet as the present invention.

The unique thing is that the boron nitride itself will decompose when heated to about 1800° C. in argon. However, with the glassy carbon coating, temperature of 2000° C. are possible without deleterious decomposition. For some reason the glassy carbon prevents/inhibits the boron nitride dissociation, enabling its use at this temperature. If just plain boron nitride powder is used, "skuds" result; that is, sparks fly out of the crucible/container in a random manner. The sparks are boron resulting from the dissociation of boron nitride; perhaps the boron re-unites with the nitrogen when it evaporates from the hot regions, but in any case, the use-temperature of pure boron nitride is limited to around 1900° C. The sparking takes away the microwave energy and prevents the boron carbide pellets from attaining temperatures over 1900° C.

Instead of about 0.1 to about 1 micron powder, boron nitride turnings/shavings may be used, or even coarser-grained boron nitride powder.

Instead of the furan resin, other phenolic resins may be applicable—whatever resinous material will yield a minimal quantity of glassy carbon that is dispersed evenly and coats the boron nitride can be used. The thickness of glassy carbon that bonds the boron nitride is thought to be very thin. The thickness has not been measured, but is believed to be less than a micron.

There is a demand in many areas for the use of boron carbide a lightweight, hard, abrasive material. A particular problem in the widespread use of boron carbide has been the requirement of hot-pressing to make boron carbide articles. Hot-pressing is a very expensive and tedious process. By using this new and improved thermal insulator, a very fast, easy densification of boron carbide can be obtained by microwave processing and sintering.

Examples of BN+8% furan resin thermal insulation

I. 550.00 gms–325 mesh BN Add 44.00 gms (8%) furan resin slurry (1400 ml acetone +44.00 gms furan resin.) Roll above mix for 30 minutes. Air dry to wet/damp mud. Size wet/damp material to desired screen mesh size. 6, 12 and 20 mesh screens used.

II. Batches:

#1 Batch BN/Resin–6+12 mesh
#2 Batch BN/Resin–12+20 mesh
#3 Batch BN/Resin–20 mesh III. Spread material for final drying.

IV. Pre-heat to 1000° C. in argon.

V. Ready for microwave heating.

There is a continual need for a variety of thermal insulating material for packing workpieces while microwave sintering. The insulation must be unreactive with the workpieces, act as good high-temperature thermal insulation, and allow microwaves to penetrate into the workpiece with minimal absorption. Coarse grit (typically having a size of about 150 to 2,000 microns) meets the requirements of a versatile unreactive thermal insulation. One embodiment of the grit is a glassy carbon (having a size of about 430 to about 2,000 microns) coated with a boron nitride layer having a thickness of about 25 to about 200 microns. These boron nitride-coated glassy carbon grains allow excellent microwave processing at temperatures up to 2400° C.—considered "ultra" high temperature microwave processing. The thermal insulation is, of course, very useful for lower temperatures also.

The coated grit is reusable and should allow many runs before reclamation by recoating the glassy carbon grains with boron nitride is necessary.

Essentially, the coating on the glassy carbon grains makes the material into an "artificial dielectric,"—capable of allowing the 2.45 GHz microwave radiation to heat the workpiece without overly heating the thermal insulation. Since boron nitride is very unreactive with oxides and nonoxides, the resulting coated grit of this discovery is nearly a universal thermal insulation/packing—extremely versatile for microwave processing investigations.

There are several variations of these grit thermal insulators: boron nitride coated with glassy carbon as mentioned; boron nitride coated with coke, and boron nitride coated with carbon fibers. Also, the earlier embodiment describes a grit of boron nitride granulated with a glassy carbon binder: additionally, boron nitride can be granulated with a boric acid non-carbon binder.

All these variations have certain areas of possible utility, but the most versatile seems to be the boron nitride coated glassy carbon grains. The coatings can be prepared by simple mixing/blending of the materials or by slurrys utilizing standard cellulosic binders or resin binders.

This development is very important to inert-atmosphere or vacuum microwave processing since both oxides and nonoxides can be processed in this thermal insulating material without worry of contamination, eutectic reactions or interactions. The utility of up to 2400° C. makes the grit an essential for "ultra" high-temperature work.

Another method of forming the grit granulation was simply to mix boron nitride powder (typically having a particle size of about 0.1 to about 1 micron) with a coarse-grained glassy carbon or boron carbide. Coating boron nitride onto glassy carbon using furan resin slurry (1:1 by weight of boron nitride and methyl alcohol plus 5.7 w/o furan resin) has been shown to leave residual carbon in the boron nitride layers. The residual carbon is considered a hindrance to achieving the best performance of this material. Therefore, boric acid $H_3BO_3$ (as a source of boron oxide glass) was used as the binder phase.

Examples of coating glassy carbon

Ingredients:

245 g. glassy carbon (630 to 2,000 microns in size)

61 g. boron nitride (25% of the glassy carbon weight)

7.35 g. boric acid (3% of the glassy carbon weight)

75 cc of methyl alcohol (approx. 60 g.)

The above ingredients were rolled for 1 hour in plastic jar; poured into a tray and dried overnight.

Similarly, this coating scheme was used for a "#36 Grit" (nominal 710 microns average particle diameter) boron carbide and a different size of glassy carbon (430 to 660 microns). Also, in one case, 3 wt. % of hydroxypropyl cellulose was added as a binder/suspension agent for the boron nitride/boric acid: this organic material leaves minimum carbon residue when heated to 500° C. in any atmosphere. The hydroxypropyl cellulose did not seem to add any improvement in making or coating or using this material. Thus, its use was discontinued.

The boron nitride-coated grits have enabled temperatures of over 2000° C. to be attained and maintained with boron carbide pellets as the workpiece part being microwave processed. At these high temperatures, boron nitride normally decomposes to boron; however, on a glassy carbon surface, the boron would form boron carbide and not melt. (Note: boron melts around 2100° C., yet these boron nitride coated glassy carbon grits have enabled 2350° C. to be reached during the microwave heating of pellets with no apparent deterioration of the grits.)

Also, boron nitride coated boron carbide grit (see above—#36 Grit or 710 microns) also enables the high temperature microwave processing of boron carbide workpiece pellets. Thus, for some reason, coating these electrically conductive, microwave reflecting or absorbing grits with boron nitride allows the microwaves to penetrate or transmit through the coated grit to reach the workpiece.

The development of this thermal insulating material has enabled the high-temperature processing of boron carbide without yttria or any other contaminating material. The preferred "casket" container for the grit was boron nitride in all our experiments. The insulating ability of this system of coated grits is remarkable. The pellet heats; the grit holds the heat in. For example, when a pellet is removed from the microwave while at "red" heat, the grit is only slightly warm. The grit can be swept off, exposing the still-red boron carbide.

Another important note: the grit insulation does not react or move away from the sintering and thus shrinking boron carbide pellet—thus allowing the pellet to densify in as uniform an environment as possible. Also, the grits can be reused. The grit has been used over 7 times with no problems.

This invention involves several areas involving packing or fillers of thermal insulation that can be used in the high-temperature microwaving of ceramics.

One version is granulated boron nitride. The material is essentially boron nitride in a grit form (having a size of about −14 mesh to about +100 mesh or about 150 to about 1400 microns). The granulation involves using a glassy carbon precursor (furan resin) to bond fine-particled (est. <5 micrometers diameter particles) boron nitride into the grit.

Another version is the coated glassy carbon grit. This is basically glassy carbon grit which has been coated with a boron nitride coating that utilizes a boric acid binder. Thus, the boron nitride coating on the glassy carbon grit has no glassy carbon precursor mixed with it (the coating is free of glassy carbon). The reason for leaving out the glassy carbon precursor in the boron nitride coating was to prevent this thermal insulation/packing from absorbing microwaves. Whenever a glassy carbon precursor was used to create the boron nitride coating on the glassy carbon granules, the material absorbed microwaves and reduced the microwave energy from reaching the workpiece. Coke is a name for low-temperature calcined carbon material that is noncrystalline—akin to true glassy carbon. However, coke is very inexpensive, costing less than $1/lb, whereas glassy carbon costs around $100/lb. Coke is generally available in the same grit size as the glassy carbon. Using such coke coated with the boron nitride coating, behavior as microwave thermal insulation, packing/filler material was shown to be like that of the boron nitride coated glassy carbon grit. In addition to coke, carbon fibers can be coated with boron nitride.

And still another version is a physical mixture of glassy carbon and boron nitride powder.

A study was undertaken to demonstrate the heating of a pellet in microwaves (2.45 GHz) utilizing different setups. The same boron nitride crucible was used in all the setups (¼" walls, about 3" OD×3" H) with a ¼" thick lid. The same 1"D, 1"H (pressed at 20,000 psi) boron carbide-2.5 wt. % C (where the carbon was derived from 8 wt. % furan resin) pellet type was used for the workpieces. The thermal insulation or packing material utilized for the setups were:

Setup a. All fine-particle sized (<5 micrometers average particle diameter) boron nitride (BN).

Setup b. 75 wt. % of this fine BN, 25 wt. % of glassy carbon grit (630 to 2000 micrometers average size)—physically blended.

Setup c. 50/50 by weight of the fine BN and glassy carbon grit.

Setup d. 25/75 by weight of the fine BN and glassy carbon grit.

Setup e. All glassy carbon grit.

All these setups were heated in a 12 kW, 2.45 GHz system using argon at atmospheric pressure; materials were heated at the same rate of power application to the system. The results showed that Setup a. led to minimal heating, with the workpiece never achieving "red" heat (800° C.). Setup b. only allowed heating to around 1200° C., even at the maximum power available. Setup c. allowed heating to about 2000° C. with the power available. Setup d. allowed heating to well over 2300° C., with excellent retention of heat, and with only a few kilowatts of "forward power". Setup e. prevented the workpiece from heating at all: only arcing occurred.

This test led to further experiments using the Setup d., resulting in boron carbide pellets sintering to over 95% of theoretical density at temperatures of around 2100° C. with about 30 minutes at 2100° C.

It should be noted that several technical experts could not explain how a mixture of glassy carbon coated with boron nitride would allow microwaves to penetrate and yet hold in the heat as observed in these tests. Also, none would have predicted that such a mixture would have led to any reasonable performance as a thermal insulator for microwaving ceramics.

Boron nitride and glassy carbon are known as "good" conductors thermally as compared to most ceramics. Electrically, boron nitride is an insulator and glassy carbon is a conductor. Generally speaking, boron nitride is considered a microwave transmitter, whereas glassy carbon is considered a microwave reflector. These properties would not lend one to expect that a combination (coating or mixture) would lead to a good thermal insulator for microwaving ceramics.

Shown in FIG. 1. is enclosure apparatus 10 for high temperature microwave sintering of ceramic article 20. Enclosure apparatus 10 comprises container 30 and thermal insulation 40 contained in container 30.

Enclosure apparatus 10 is supported inside microwave furnace 60 by thermally insulating bricks 50. Thermally insulating bricks 50 can be made of microwave-noncoupling materials such as alumina and silica. Vacant space 70 reduces heat flow from container 30 to insulating bricks 50.

Container 30 can be made from a material essentially transparent to microwaves such as fused silica, clay-bonded-fused silica, sintered fused silica, alumina 10 w/o silica composite, alumina, yttria, and boron nitride. Container 30 has a minimum wall thickness of about 0.06 inches and contains thermal insulation 40 surrounding ceramic article 20.

Thermal insulation 40 is an electrical and thermal insulator and essentially a noncoupler with microwaves. Thermal insulation 40 contained inside container 30 surrounds and intimately contacts ceramic article 20. Thermal insulation 40 provides a bed having a thickness of about 0.75 inch surrounding ceramic article 20. Thermal insulation 40 provides microwave-noncoupling thermal insulation for retaining the heat produced from microwave absorbance in ceramic article 20.

One embodiment of thermal insulation 40 comprises granules of boron nitride coated with a very thin layer of glassy carbon. The granules of boron nitride have a particle size ranging from about 150 to about 1400 microns.

Another embodiment of thermal insulation 40 comprises grains of glassy carbon coated with a boron nitride layer. The glassy carbon has a particle size ranging from about 430 to about 2,000 microns. The layer of boron nitride is about 25 to about 200 microns thick.

Still another embodiment of thermal insulation 40 comprises a blended mixture of glassy carbon grains and boron nitride powder. The glassy carbon grains have a size ranging from about 430 to about 2,000 microns. The boron nitride powder has a particle size less than 5 microns.

A method for preparing thermal insulation 40 comprising granules of boron nitride coated with a layer of glassy carbon comprises the following steps:

Step 1—Boron nitride granules having a granule size of about 5 microns is provided. The boron nitride granules consists essentially of boron nitride particulates having a particle size of approximately 0.1 microns.

Step 2—A liquid glassy carbon precursor is added to the boron nitride granules of Step 1 to form a slurry mixture. The liquid glassy carbon precursor comprises a polymer dissolved in a polar solvent such as acetone. The polymer has a three-dimensionally crosslinked structure and a pyrolysis of the polymer takes place in a solid state. Polymers such as polyphenylenes, polyimides, aromatic epoxy formulations, phenolic resins, and furan resins can be used.

Step 3—The slurry mixture of Step 2 is blended to form a blended mixture and to partially evaporate the polar solvent.

Step 4—The blended mixture of Step 3 is sieved through a 6 mesh sieve to form a grit comprising a blended mixture of glassy carbon precursor and boron nitride granules.

Step 5—The grit of Step 4 is dried to form dried grit.

Step 6—The dried grit of Step 5 is heated at a temperature such as 1000° C. and for a period of time sufficient to carbonize the glassy carbon precursor contained in the dried grit to form a glassy carbon phase from the glassy carbon precursor to form a thermal insulation comprising a grit of boron nitride granules bonded together with a very thin layer of glassy carbon.

A method for preparing thermal insulation 40 comprising glassy carbon grains coated with a layer of boron nitride comprises the following steps:

Step 1—Glassy carbon grains having a grain size ranging from about 430 to about 2,000 microns are provided.

Step 2—A boron nitride powder, lot one-fourth the weight of the glassy carbon grains of Step 1, is added to an equal weight of methyl alcohol containing boric acid binder, at 3% of the weight of the glassy carbon grains of Step 1, to form a slurry. The boron nitride slurry comprises boron nitride, boric acid, and methyl alcohol.

Step 3—The slurry of Step 2 is blended with the glassy carbon grains of Step 1 by rolling for 1 hour in a plastic jar to form a blended mixture.

Step 4—The blended mixture of Step 3 is partially dried to partially evaporate the methyl alcohol to form a partially dried blended mixture.

Step 5—The partially dried blended mixture of Step 4 is sieved through a 6 mesh sieve to form a grit comprising a blended mixture of glassy carbon grains coated with boron nitride.

Step 6—The grit of Step 5 is dried to form dried grit to be used as thermal insulation 40.

A method of preparing thermal insulation 40 comprising a mixture of glassy carbon grains and boron nitride powder comprises the following steps:

Step 1—Glassy carbon grains having a size ranging from about 430 to about 2,000 microns are provided.

Step 2—Boron nitride powder is added to the glassy carbon grains of Step 1 to form a mixture. The boron nitride powder has a particle size less than 5 microns. In the preferred mixture the boron nitride powder comprises 25 weight percent of the mixture and the glassy carbon grains comprise 75 weight percent of the mixture.

Step 3—The mixture of Step 2 is blended to form thermal insulation comprising a blended mixture of glassy carbon grains and boron nitride powder.

While there has been shown and described what is at present considered the preferred embodiments of the invention, it will be obvious to those skilled in the art that various changes and modifications may be made therein without departing from the scope of the invention as defined by the appended claims.

What is claimed is:

1. A method of preparing thermal insulation for high temperature microwave sintering operations comprising the following steps:

Step 1—providing boron nitride granules;

Step 2—adding a liquid glassy carbon precursor to said boron nitride granules of Step 1 to form a mixture;

Step 3—blending said mixture of Step 2 to form a blended mixture;

Step 4—sieving said blended mixture of Step 3 to form a grit;

Step 5—drying said grit of Step 4 to form dried grit; and

Step 6—heating said dried grit of Step 5 at a temperature and for a period of time sufficient to carbonize said glassy carbon precursor contained in said dried grit to form a glassy carbon phase from said glassy carbon precursor to form a thermal insulation material for high temperature microwave sintering operations comprising granules of boron nitride granules coated with a layer of glassy carbon.

2. A method of preparing thermal insulation for high temperature microwave sintering operations in accordance with claim 1 herein said boron nitride granules has a granules size of about 5 microns and consisting essentially of boron nitride particulates having a particle size of about 0.1 to about 1 micron.

3. A method of preparing thermal insulation for high temperature microwave sintering operations in accordance with claim 1 herein said grit has a grit size sufficient to pass through a 6 mesh sieve, said grit comprises a blended mixture of glassy carbon precursor and boron nitride granules.

4. A method of preparing thermal insulation for high temperature microwave sintering operations in accordance with claim 1 wherein said liquid glassy carbon precursor comprises a polymer dissolved in a polar solvent, said polymer must have a three-dimensionally crosslinked structure and a pyrolysis of said polymer must take place in a solid state.

5. A method of preparing thermal insulation for high temperature microwave sintering operations in accordance with claim 4 wherein said polymer in is selected from the group consisting of polyphenylenes, polyimides, aromatic epoxy formulations, phenolic resins, furan resins, and mixtures thereof.

6. A method of preparing thermal insulation for high temperature microwave sintering operations in accordance with claim 4 wherein said polar solvent is acetone.

7. A method of preparing thermal insulation for high temperature microwave sintering operations in accordance with claim 1 wherein said temperature of Step 6 is about 1000° C.

8. A method of preparing thermal insulation for high temperature microwave sintering operations comprising the following steps:

Step 1—providing glassy carbon grains;

Step 2—preparing a liquid boron nitride slurry;

Step 3—blending said slurry of Step 2 with said glassy carbon grains of Step 1 to form a blended mixture;

Step 4—partially drying said blended mixture of Step 3 to form a partially dried blended mixture;

Step 5—sieving said partially dried blended mixture of Step 4 to form a grit, said grit comprising a blended mixture of glassy carbon grains coated with boron nitride;

Step 6—drying said grit of Step 5 to form dried grit to be used as a thermal insulation material for high temperature microwave sintering operations comprising a grit of glassy carbon coated with boron nitride.

9. A method of preparing thermal insulation for high temperature microwave sintering operations in accordance with claim 8 wherein said glassy carbon grains have a grain size ranging from about 430 to about 2,000 microns.

10. A method of preparing thermal insulation for high temperature microwave sintering operations in accordance with claim 8 wherein said grit has a grit size sufficient to pass through a 6 mesh sieve.

11. A method of preparing thermal insulation for high temperature microwave sintering operations in accordance with claim 8 wherein said boron nitride slurry comprises boron nitride, boric acid, and methyl alcohol.

12. A method of preparing thermal insulation for high temperature microwave sintering operations comprising the following steps:

Step 1—providing glassy carbon grains;

Step 2—adding boron nitride powder to said glassy carbon grains of Step 1 to form a mixture; and Step 3—blending said mixture of Step 2 to form thermal insulation for high temperature microwave sintering operations comprising boron nitride powder and glassy carbon grains.

13. A method of preparing thermal insulation for high temperature microwave sintering operations in accordance with claim 12 wherein said glassy carbon grains have a grain size ranging from about 430 to about 2,000 microns.

14. A method of preparing thermal insulation for high temperature microwave sintering operations in accordance with claim 12 wherein said boron nitride powder has a particle size less than 5 microns.

15. A method of preparing thermal insulation for high temperature microwave sintering operations in accordance with claim 12 wherein said boron nitride powder is 25 weight percent and said glassy carbon grains are 75 weight percent of said mixture in Step 2.

* * * * *